United States Patent Office 3,238,224
Patented Mar. 1, 1966

3,238,224
PRODUCTION OF 6,8-DITHIOOCTANOYL AMIDES
Masao Ohara, Ibaraki, Kiyotsugu Yamamoto, Abenoku, Osaka, and Yoshio Deguchi, Suita, Japan, assignors to Fujisawa Pharmaceutical Co., Ltd., Osaka, Japan, a company of Japan
No Drawing. Filed June 12, 1961, Ser. No. 116,288
Claims priority, application Japan, June 17, 1960,
35/28,427
6 Claims. (Cl. 260—327)

This invention relates to new and useful improvements in the production of 6,8-dithiooctanoyl amides and more particularly is concerned with a novel process for forming compounds having the following general formula

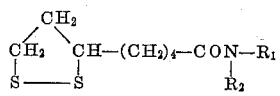

wherein $R_1$ and $R_2$ are either hydrogen or organic radicals. More specifically, the invention contemplates selecting the radicals from the group consisting of alkyl, aryl, alkylamino, arylamino, acylamino radicals, the residue of α-amino acid and peptide.

It has been ascertained both by laboratory tests and by clinical experiments carried out with the 6,8-dithiooctanoyl amides that they exhibit an activity superior to that of thioctic acid, which is known for its vitamin-like action as well as for its potent action to promote liver function and detoxification capacity. Further, pharmaceutical preparations of the amides are stable, tasteless and odorless, while thioctic acid has unpleasant taste and odor and tends to be unstable.

The following methods have been described for synthesizing 6,8-dithiooctanoyl amide in the laboratory. The first (A. F. Wagner et al.: 78 J. Am. Chem. Soc., 5081, 1956) starts with thioctic acid and reacts same with caustic soda, drying the resulting product by freeze drying, reacting the sodium salt of the acid thus produced with oxaloyl chloride in dry benzene and then with ammonia in dry dioxane. The second method (L. J. Reed et al.: 232, J. Biol. Chem., 145, 1958) comprises reacting thioctic acid with isobutyl chloro formate in tetrahydrofuran solvent including triethylamine and then with ammonia.

These known methods are, however, complicated in operation and the yield of the product is not satisfactory so that they could not be profitably adapted to large-scale commercial production.

A third method is that described in our co-pending application, Serial No. 61,822, filed October 1, 1960, wherein a 6,8-dihalogeno octanoic acid is reacted with a halogenating agent and the resultant 6,8-dihalogenooctanoyl halide reacted with an amine having the formula $HNR_1R_2$.

It is desirable to establish a new and improved method suitable for the production of 6,8-dithiooctanoyl amides on a large scale commercial basis that will not produce large quantities of polymerized by-products.

It is an object of this invention to provide a novel, economical and improved process of producing 6,8-dithiooctanoyl amide and analogues thereof.

Other objects of the present invention and advantageous features thereof will appear hereinafter.

The process of this invention comprises reacting 6,8-dithiooctanoic acid with a halogenating agent and the resulting 6,8-dithiooctanoyl halide with an amine of the formula $$HN\begin{matrix}—R_1\\ |\\ R_2\end{matrix}$$

wherein $R_1$ and $R_2$ are the same substituents as before.

The reaction steps of this invention may be illustrated diagrammatically as follows:

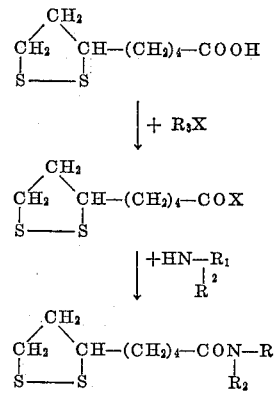

wherein $R_3X$ is a halogenating agent, X is a halogen and $R_1$ and $R_2$ are the same substituents as indicated above.

The reaction of 6,8-dithiooctanoic acid with a halogenating agent is effected in the presence or absence of an inert solvent such as benzene, chloroform, carbon tetrachloride, etc. to produce a 6,8-dithiooctanoyl halide.

Phosphorus trichloride, phosphorus pentachloride, thionyl chloride and phosphorus tribromide may be used as halogenating agent in this reaction, thionyl chloride being a preferred agent. The reaction is conducted quantitatively according to this invention. The reaction may be hastened by addition of a base such as pyridine, dimethylformamide, etc. The halide thus obtained, oily and difficult to refine as polymerization takes place, may be used in the next step of the reaction without any refinement.

The halide is dissolved in a solvent and reacted with an amine of the formula mentioned above or a salt thereof in the presence or absence of a base such as caustic alkali, alkali metal carbonate, pyridine, etc., to neutralize any acid produced. Ammonia, primary or secondary alkylamines and salts thereof, primary or secondary arylamines and salts thereof, alkyl- or aryl-hydrazine, acid hydrazide (aliphatic, aromatic and heterocyclic) and salts thereof, amino acids and functional derivatives, peptide and the like represent examples of the amine or its salts used in this reaction. When ammonia or lower alkylamine is used, water may be a solvent used, and the reaction is completed rapidly precipitating the product quantitatively.

The crude amide thus obtained confirms the presence of dithiolane ring, showing λmax 331–332 mμ in ultraviolet absorption spectrum and, it includes only a little amount of polymers or analogue compounds as by-products. Pure amides may be obtained by recrystallization or distillation of the crude one, whereas the most preferable method is to be brought into contact with a solution of caustic alkali or alkali metal carbonate at room temperature or at elevated temperature to exclude the by-products.

When a functional derivative of amino acid such as amino acid alkyl ester is used as an amine portion of this invention, hydrolysis is necessary to produce the product having a carboxyl radical.

The following examples serve to illustrate the present invention without, however, limiting the same thereto.

*Example 1*

21.0 g. of 6,8-dithiooctanoic acid are dissolved in 100 cc. of benzene and 13.0 g. of thionyl chloride are added drop by drop to the solution under cooling and stirring. After completion of the addition the mixture is stirred for four hours at room temperature and for additional thirty minutes at 35–40° C. About ⅓ volume of the benzene is removed under reduced pressure and the solution of 6,8-dithiooctanoyl chloride is poured into 200 cc. of 20% aqueous solution of ammonia under cooling with ice-water and the solution is stirred for about three hours under cooling. The precipitate produced is gathered by filtration, washed with water and with hexane and dried to obtain 19.7 g. (95% theoretical recovery) of 6,8-dithiooctanoyl amide having M.P. 117–122° C.

Ultraviolet absorption spectrum:

$$\lambda_{max.}^{CH_3OH} \; 332 \; m\mu \; (\epsilon 134)$$

5.0 g. of this compound are recrystallized from benzene to produce 3.3 g. of 6,8-dithiooctanoyl amide having M.P. 129–130° C.

Ultraviolet absorption spectrum:

$$\lambda_{max.}^{CH_3OH} \; 332 \; m\mu \; (\epsilon 144)$$

8.0 g. of the same compound are mixed with a solution of 1.6 g. of caustic soda, 20 cc. of water and 80 cc. of methanol, and the mixture is heated for one hour and a half in a water bath kept at 80° C. The methanol is removed under reduced pressure. The residue is extracted with chloroform. The chloroform is removed and the residue is recrystallized from benzene to obtain 4.7 g. of 6,8-dithiooctanoyl amide, M.P. 129–130° C.

Ultraviolet absorption spectrum:

$$\lambda_{max.}^{CH_3OH} \; 332 \; m\mu \; (\epsilon 147)$$

Example 2

To a solution of 25.0 g. of diisopropylamine in 200 cc. of benzene is added drop by drop at room temperature a solution of crude 6,8-dithiooctanoyl chloride prepared according to Example 1. The mixture is stirred for three hours at the same temperature. The reaction mixture is washed sequentially with dilute hydrochloric acid, with an aqueous solution of sodium bicarbonate and with water. The benzene layer is dried, the benzene is removed and the residue is distilled in vacuo yielding 6,8-dithiooctanoyl diisopropylamide at B.P.$_{0.1}$ 152–157° C.

*Analysis.*—Calculated for $C_{14}H_{27}OHS_2$: C, 58.11; H, 9.41; N, 4.83. Found: C, 58.28; H, 9.42; N, 4.84.

Ultraviolet absorption spectrum:

$$\lambda_{max.}^{CH_3OH} \; 332 \; m\mu \; (\epsilon 145)$$

Example 3

To a solution of 22.4 g. of DL-methionine and 27 g. of sodium bicarbonate in 500 cc. of water is added drop by drop under cooling with ice-water a solution of crude 6,8-dithiooctanoyl chloride prepared according to Example 1. The mixture is stirred for two hours at room temperature. The reaction mixture is extracted with 200 cc. of chloroform. The extract is washed with dilute hydrochloric acid and with water, and dried. The chloroform is removed under reduced pressure. The residue is recrystallized from a mixture of ethyl acetate and petroleum ether yielding N-(6,8-dithiooctanoyl)-DL-methionine, M.P. 101–103° C.

*Analysis.*—Calculated for $C_{13}H_{23}O_3NS_3$: C, 46.26; H, 6.87; N, 4.15. Found: C, 46.18; H, 7.14; N, 4.05.

Ultraviolet absorption spectrum:

$$\lambda_{max}^{CH_3OH} \; 332 \; m\mu \; (\epsilon 148)$$

Example 4

To a mixture of 6.0 g. of DL-methionine methyl ester, 2.9 g. of pyridine and 50 cc. of benzene is added drop by drop under stirring and cooling with ice-water a solution of 6,8-dithiooctanoyl chloride prepared according to Example 1 from 5.0 g. of 6,8-dithiooctanoic acid, 3.1 g. of thionyl chloride and 50 cc. of benzene. The mixture is stirred for four hours at room temperature. The reaction mixture is washed sequentially with dilute hydrochloric acid, with an aqueous solution of sodium bicarbonate and with water, and dried. The solvent is removed. The residue is dissolved in a methanolic solution of sodium hydroxide prepared from 4 g. of sodium hydroxide, 10 cc. of water and 70 cc. of methanol, and the solution is allowed to stand for 60 hours in a dark place. The methanol is removed under reduced pressure and to the residue is added 100 cc. of water. The insoluble portion is removed by extraction with ether and the aqueous solution is acidified with hydrochloric acid and extracted with chloroform. About 6.5 g. of a gum-like by-product insoluble in the chloroform, which includes polymers of the final product of this process and is depolymerized with alkali, are obtained. The chloroform extract is washed with water and dried. The chloroform is removed to obtain crystals of N-(6,8-dithiooctanoyl)-DL-methionine, which are recrystallized from ethyl acetate-petroleum ether to produce crystals of M.P. 102–103° C.

Ultraviolet absorption spectrum:

$$\lambda_{max}^{CH_3OH} \; 332 \; m\mu \; (\epsilon 149)$$

The compound obtained shows no depression of melting point on admixture with the final product of Example 3.

Example 5

To a mixture of 6.5 g. of diethyl L-glutamate, 2.6 g. of pyridine and 20 cc. of chloroform is added drop by drop under stirring and cooling with ice-water a solution of 6,8-dithiooctanoyl chloride prepared according to the method of Example 1 from 4.4 g. of 6,8-dithiooctanoic acid, 3 g. of thionyl chloride and 50 cc. of chloroform. The mixture is stirred for four hours at room temperature. The reaction mixture is washed sequentially with dilute hydrochloric acid, with an aqueous solution of sodium bicarbonate and with water, and dried. The solvent is removed. The residue is dissolved in a methanolic solution of sodium hydroxide prepared from 4 g. of sodium hydroxide, 10 cc. of water and 70 cc. of methanol and allowed to stand in a dark place for 60 hours at room temperature. The methanol is removed under reduced pressure and to the residue is added 100 cc. of water. The insoluble portion is removed by extraction with chloroform. The aqueous solution is acidified with hydrochloric acid and extracted with chloroform. The extract is washed with water and dried. The chloroform is removed to produce 3.3 g. (46.1% theoretical yield) crystals of N-(6,8-dithiooctanoyl)-L-glutamic acid. This is recrystallized from ethyl acetate-petroleum ether to produce crystals of M.P. 105–107° C.

Ultraviolet absorption spectrum:

$$\lambda_{max}^{CH_3OH} \; 332 \; m\mu \; (\epsilon 146)$$

*Analysis.*—Calculated for $C_{13}H_{21}O_5NS_2$: N, 4.17. Found: N, 4.30.

Example 6

To a mixture of 13.5 g. of aniline and 50 cc. of benzene is added drop by drop under stirring and cooling with ice-water a solution of 6,8-dithiooctanoyl chloride prepared according to the method of Example 1 from 10.0 g. of 6,8-dithiooctanoic acid, 6.2 g. of thionyl chloride and 100 cc. of benzene. The mixture is stirred for two hours and a half at room temperature. The reaction mixture is washed sequentially with dilute hydrochloric acid, with an aqueous solution of sodium bicarbonate and with water, and dried. The solvent is removed and the residue is dissolved in benzene and to the solution is added petroleum ether to produce 6.5 g. (48% theoretical yield) crystals of 6,8-dithiooctanoyl anilide. The compound is recrystallized from a mixture of benzene and petroleum ether to crystals of M.P. 72–73° C.

Ultraviolet absorption spectrum:

$$\lambda_{max}^{CH_3OH}\ 332\ m\mu$$

*Analysis.*—Calculated for $C_{14}H_{19}ONS_2$: C, 59.78; H, 6.76; N, 4.98. Found: C, 59.83; H, 6.74; N, 5.01.

Example 7

5.0 g. of 6,8-dithiooctanoic acid, 3.1 g. of thionyl chloride and 30 cc. of chloroform are treated according to the method of Example 1 to prepare a solution of 6,8-dithiooctanoyl chloride. To a suspension of 3.3 g. of isonicotinic acid hydrazide in a mixture of 6.7 g. of pyridine and 30 cc. of chloroform is added drop by drop under stirring and cooling with ice-water the said solution of 6,8-dithiooctanoyl chloride and the mixture is stirred for three hours at room temperature. The reaction mixture is washed with an aqueous solution of sodium bicarbonate and with water, and dried. The solvent is removed. The residue is dissolved in 50 cc. of absolute ethanol and dry hydrogen chloride gas is introduced into the solution. After addition of ether, the solution is allowed to stand to produce crystals of 1-isonicotinoyl-2-thioctoyl-hydrazine hydrochloride. The crystals are gathered by filtration and 3.4 g. (39% theoretical yield) recrystallized from absolute ethanol-ether. M.P. 179–181° C.

*Analysis.*—Calculated for $C_{14}H_{20}O_2N_3S_2Cl$: C, 46.46; H, 5.58; N, 11.61. Found: C, 46.15; H, 5.83; N, 11.43.

Example 8

5.0 g. of 6,8-dithiooctanoic acid are dissolved in 20 cc. of chloroform and to the solution is added drop by drop under stirring and cooling with ice-water a solution of 1.3 g. of phosphorus trichloride in 20 cc. of chloroform. The mixture is stirred for four hours at room temperature and for additional 30 minutes at 35–40° C. The reaction mixture is poured into 50 cc. of 20% aqueous solution of ammonia under cooling with ice-water and stirred for about three hours. The chloroform layer is separated, the water layer is extracted with chloroform and the chloroform layers thus obtained are gathered and dried. The chloroform is removed yielding 4.0 g. (80% theoretical) of 6,8-dithiooctanoyl amide, M.P. 123–125° C. This is refined according to the method of Example 1 to produce 2.8 g. of 6,8-dithiooctanoyl amide, M.P. 129° C.

Ultraviolet absorption spectrum:

$$\lambda_{max}^{CH_3OH}\ 332\ m\mu\ (\epsilon143)$$

Example 9

5.0 g. of 6,8-dithiooctanoic acid are dissolved in 40 cc. of chloroform and to the solution are added in small portions 5.1 g. of phosphorus pentachloride under stirring and cooling with ice-water. The mixture is stirred for four hours at room temperature and for additional 30 minutes at 40–45° C. The reaction mixture is poured into 300 cc. of 20% aqueous solution of ammonia under cooling with ice-water and stirred for about three hours. The chloroform layer is separated, the water layer is extracted with chloroform and the chloroform layers thus obtained are gathered and dried. The chloroform is removed yielding 4.5 g. (90% theoretical) of 6,8-dithiooctanoyl amide, M.P. 124–125° C., which are refined according to the method of Example 1 to produce 3.6 g. of crystals having M.P. 130° C.

Ultraviolet absorption spectrum:

$$\lambda_{max}^{CH_3OH}\ 332\ m\mu\ (\epsilon147)$$

Example 10

5.0 g. of 6,8-dithiooctanoic acid are dissolved in 20 cc. of chloroform and to the solution is added drop by drop under stirring and cooling with ice-water a solution of 2.4 g. of phosphorus tribromide in 20 cc. of chloroform. The mixture is treated according to the method of Example 8 to obtain 1.2 g. (24% theoretical yield) of 6,8-dithiooctanoyl amide, M.P. 118–120° C. This is refined according to the method of Example 1 to obtain 0.5 g. of 6,8-dithiooctanoyl amide, M.P. 129° C.

Ultraviolet absorption spectrum:

$$\lambda_{max}^{CH_3OH}\ 332\ m\mu\ (\epsilon144)$$

We claim:
1. A method of preparing a 6,8-dithiooctanoyl amide of the formula

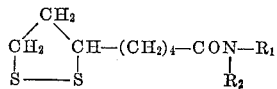

wherein $R_1$ and $R_2$ are selected from the group consisting of hydrogen, an $\alpha$-amino acid residue, a peptide and alkyl, aryl, alkylamino, arylamino and acylamino radicals comprising the steps of (1) reacting a 6,8-dithiooctanoic acid with a chloride selected from the group consisting of phosphorous trichloride, phosphorus pentachloride and thionyl chloride to produce a 6,8-dithiooctanoyl chloride, and (2) reacting said 6,8-dithiooctanoyl chloride with an amine compound selected from the group having the formula $$\begin{array}{c}HN-R_1\\|\\R_2\end{array}$$

and salts thereof to produce said amide.

2. The method of claim 1 wherein said reaction step (1) is effected in the presence of an inert solvent selected from the group consisting of benzene, chloroform and carbon tetrachloride.

3. The method of claim 1 wherein said reaction step (1) is effected in the presence of a base selected from the group consisting of pyridine and dimethylformamide.

4. The method of claim 1 wherein said reaction step (2) is effected in the presence of a base selected from the group consisting of a caustic alkali, an alkali metal carbonate and pyridine.

5. The method of claim 1 wherein said chloride is thionyl chloride.

6. The method of claim 1 wherein said amide as produced is further refined by contacting with a solution selected from the group consisting of a caustic alkali and an alkali metal carbonate to remove impurities.

References Cited by the Examiner

UNITED STATES PATENTS

| | | | |
|---|---|---|---|
| 2,694,066 | 11/1954 | Reed | 260—327 |
| 2,875,238 | 2/1959 | Holly et al. | 260—327 |

FOREIGN PATENTS

| | | |
|---|---|---|
| 796,564 | 6/1956 | Great Britain. |
| 796,563 | 6/1956 | Great Britain. |

OTHER REFERENCES

Noller, Textbook of Organic Chemistry, Second Edition, 1958, pages 122–23.

Sidgwick, Organic Chemistry of Nitrogen, 1937, pages 138–39.

WALTER A. MODANCE, *Primary Examiner.*

IRVING MARCUS, *Examiner.*